United States Patent
Randolph et al.

[11] Patent Number: 5,655,297
[45] Date of Patent: Aug. 12, 1997

[54] METHOD TO PART WELDED VESSEL SECTIONS WITHOUT VIOLATING INTERNAL CLEANLINESS

[75] Inventors: Harrison P. Randolph, Monroe Falls; Rudolph M. Canfield, Rittman; William J. Bees, Wadsworth, all of Ohio

[73] Assignee: The Babcock & Wilcox Company, New Orleans, La.

[21] Appl. No.: 518,951

[22] Filed: Aug. 24, 1995

[51] Int. Cl.$^6$ ................................................... B23P 15/26
[52] U.S. Cl. .................. 29/890.031; 29/890.051; 29/402.19
[58] Field of Search .............. 29/890.031, 890.051, 29/402.19, 402.02, 402.03, 558, 426.4, 426.5; 83/13

[56] References Cited

U.S. PATENT DOCUMENTS

| | | | |
|---|---|---|---|
| 4,406,856 | 9/1983 | Wilkins et al. | 29/840.031 |
| 4,633,555 | 1/1987 | Legge | 29/890.031 |
| 4,830,551 | 5/1989 | Brennan et al. | 29/890.031 |
| 4,872,249 | 10/1989 | Vanderpol et al. | 29/890.031 |
| 4,979,294 | 12/1990 | Bowman et al. | 29/890.031 |

*Primary Examiner*—Irene Cuda
*Attorney, Agent, or Firm*—Robert P. Bennett, Jr.; Robert J. Edwards

[57] ABSTRACT

A method and apparatus of separating a vessel which is partly welded to a tubesheet of a tube bundle, includes removing the weld seam and reducing the wall thickness of the vessel until only approximately ⅛" of wall thickness remains and thereafter parting the vessel from the tubesheet by extruding the remaining wall thickness using a wheel cutter. The wheel cutter itself comprises a uniform thickness disk having a frusto-conical, cylindrical and subsequent conical portion on its outer periphery, the conical portion tapering to a greater extent that the frusto-conical portion.

4 Claims, 5 Drawing Sheets

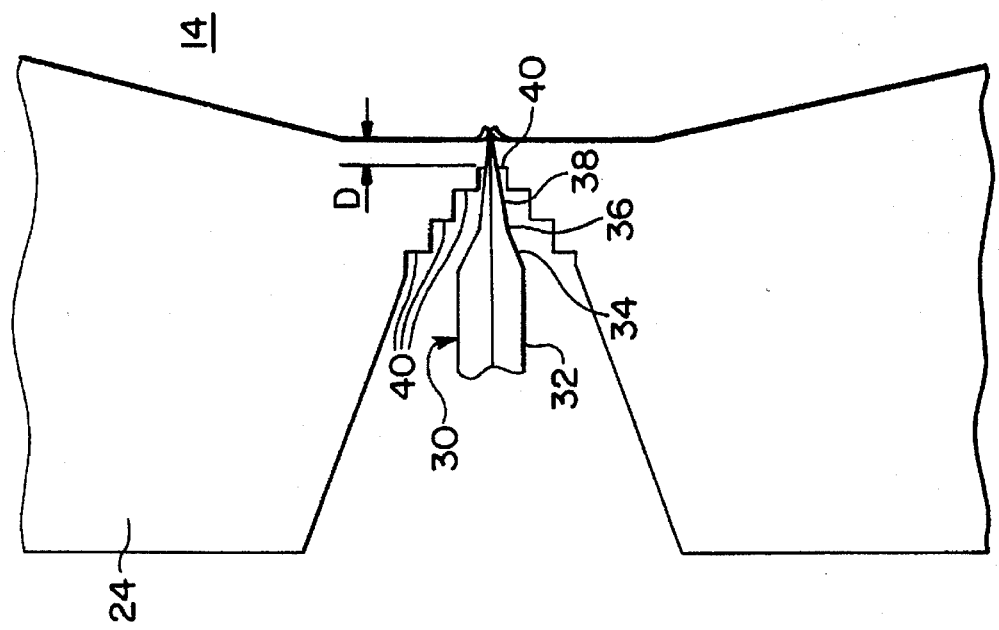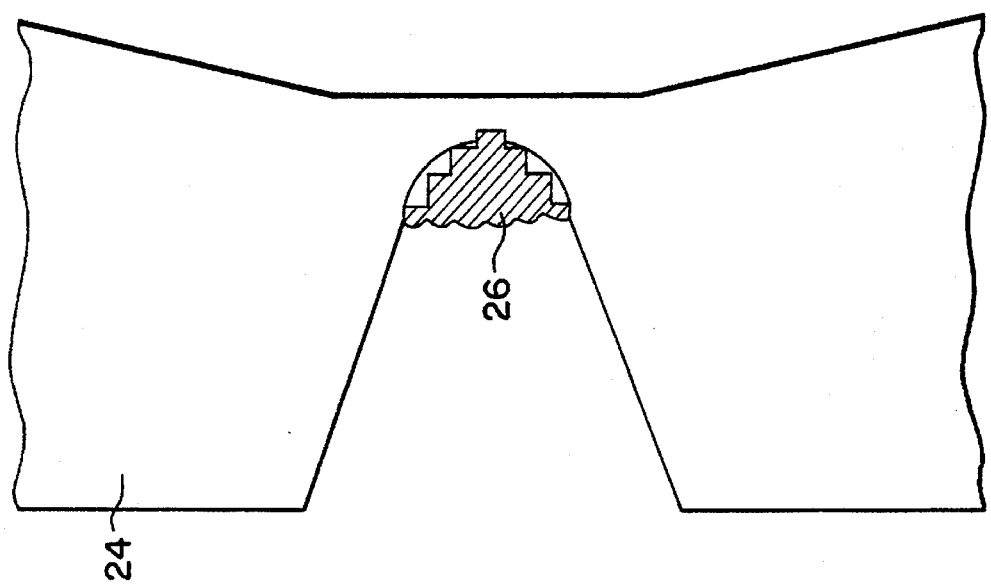

METHOD TO PART WELDED VESSEL SECTIONS WITHOUT VIOLATING INTERNAL CLEANLINESS

BACKGROUND OF THE INVENTION

1. Field of the Invention

The present invention relates, in general, to cutting tools, and in particular, to a new and useful portable cutting tool and method which is capable of severing vessels while maintaining internal cleanliness conditions.

2. Description of the Related Art

U.S. Pat. No. 1,366,063 teaches a process for severing a bar utilizing a pair of wedge-shaped cutters located in the seam plane transverse to the axis of the bar. A first cut is made in the bar by the cutters to a certain depth at a high rate of speed. The bar is then rotated 90° on its axis and subjected to a second cut for severing the bar.

U.S. Pat. No. 2,471,650 discloses two types of cutting tools having a rotatable cutting edge, a circular cutting tool having a saw-tooth cutting edge, and a cutting tool having a smooth cutting edge similar to a pizza cutter.

U.S. Pat. No. 3,958,732 teaches the breaking of steel rods into billets comprising cutting a circumferential notch into a surface of the steel rod. The rod is heated and quenched in order to develop a crack extending from the notch toward the center of the rod. A force is then applied to the rod at the notch which severs the rod.

U.S. Pat. No. 4,126,064 discloses a method for cutting a tube which utilizes a pair of cutting tools which provide a cut into the outside diameter of the tube to a certain depth. An annular bulge is formed at the inside diameter of the tube. The annular bulge is removed by a boring tool. The cutting tools are then reinserted into the original cut for cutting through the remaining pipe material.

U.S. Pat. No. 4,549,678 discloses a method for separating a cut tube end comprising a cutting tool which is used to cut a groove in the wall of a pipe. As a groove is cut circumferentially around the pipe by the cutter, a separator roller is inserted into the groove for breaking the thin metal remaining at the bottom of the groove which causes separating of the cut sections.

In the servicing of breeder reactor steam generators, a method of parting 1 ½"φ×0.170" wall tubes without violating the cleanliness of the vessel interior was required. A tool was developed which fit inside the tube hole in the tubesheet and extended into the tube itself where it reduced the wall thickness where a parting cutter could sever the tube from the tubesheet. FIG. 1 depicts the tubesheet 10 and tube 12. A clean area 14 must be maintained in the steam generator. FIG. 2 depicts a relief cut 16 in the tube 12 and a tool drive mechanism 18 with cutting wheel 20. FIG. 3 depicts the parting tool 22 which severed the tube from the tubesheet.

This equipment was developed by B&W in the early 1980's

A completed tube bundle (tubesheet 10 and tubes 12) was inserted into a shell 24 in FIG. 4, and partially welded into position with approximately ⅜" of weld at 26. FIG. 4 depicts the shell/bundle assembly 28.

The alignment between sections violated the contract requirements. Therefore, the shell needed to be separated from the bundle assembly and repositioned. Cleanliness of the bundle was a paramount issue. Any violation of cleanliness would result in a major cleaning effort at a high cost in time and money.

A method of parting the pieces cleanly was required. The size of the repair operation and the different approach to the problem required a totally unique setup to part the vessels.

SUMMARY OF THE INVENTION

The invention comprises a device and method for separating a tube bundle, i.e. a tubesheet and tubes, from a vessel shell. A portable cutting tool such as a pipe cutter which is similar in appearance to a pizza cutting wheel, is used to make a cut into a weld until the weld has a thickness of approximately ⅛ inch. After cutting this groove in the weld to the desired depth, a parting tool or wedge is inserted in the cut. By applying force to the wedge, the weld is broken thereby separating the bundle assembly from the shell vessel. The method allows for separate cutting and severing operations to be completed without producing a large amount of scraps, chips or grinding dust. Thus, a high level of cleanliness is achieved and maintained.

Accordingly, an object of the present invention is to provide a method and apparatus for parting a tube bundle which includes a tubesheet and tubes from a vessel shell, involving removing material from around the vessel until a thickness of approximately ⅛ inch remains and then cutting through the ⅛ thickness using a parting wheel to minimize chips, dust and other contaminants.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

In the drawings:

FIG. 5 is an enlarged sectional view of a weld to be removed according to the present invention.

FIG. 6 view similar to FIG. 5 of a subsequent step in the process of the present invention

DESCRIPTION OF THE PREFERRED EMBODIMENT

Figure 1:
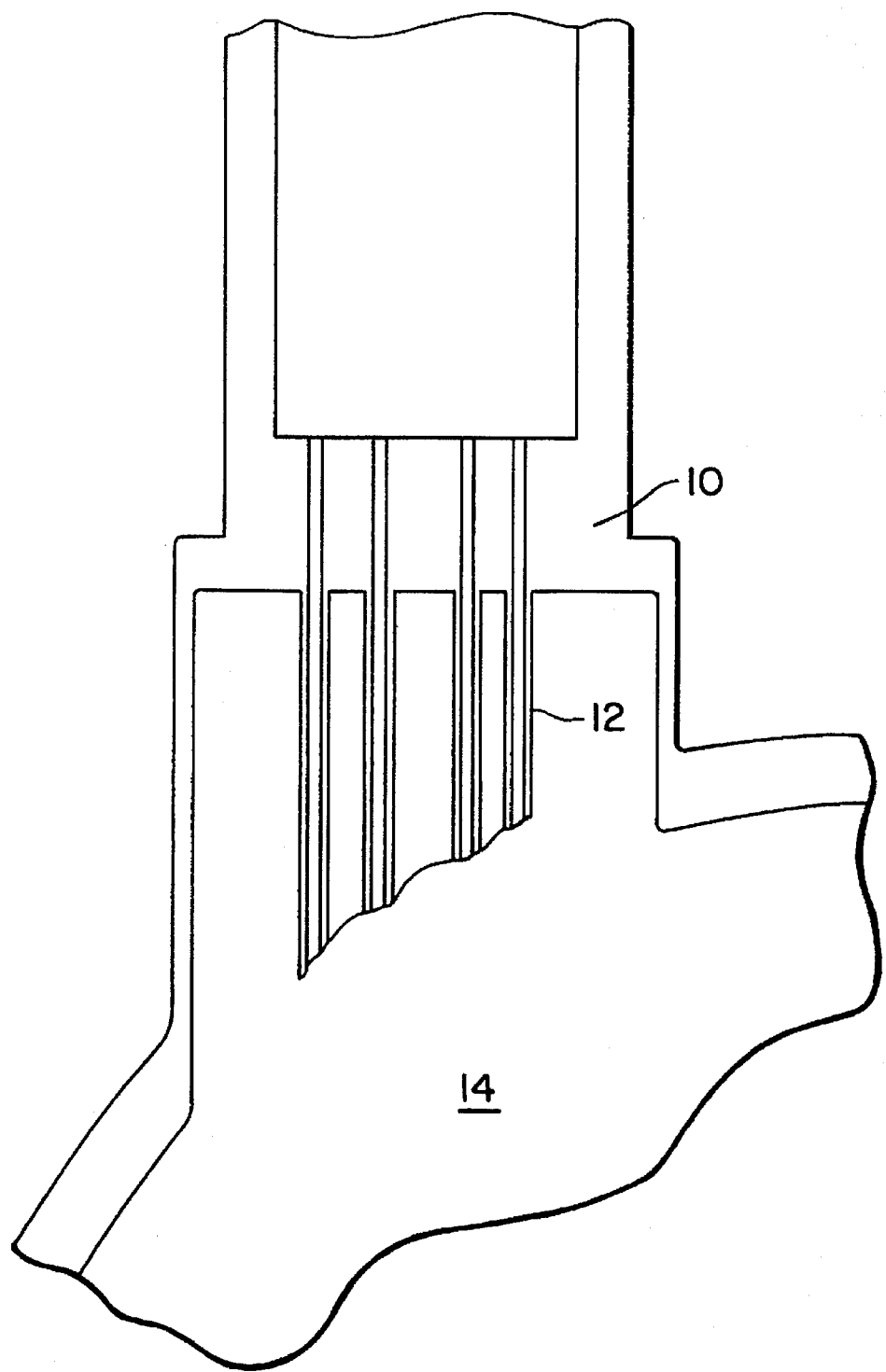
FIG. 1 is a schematic representation of a tube bundle and a cleanliness area of a breeder reactor steam generator.
Figure 2:
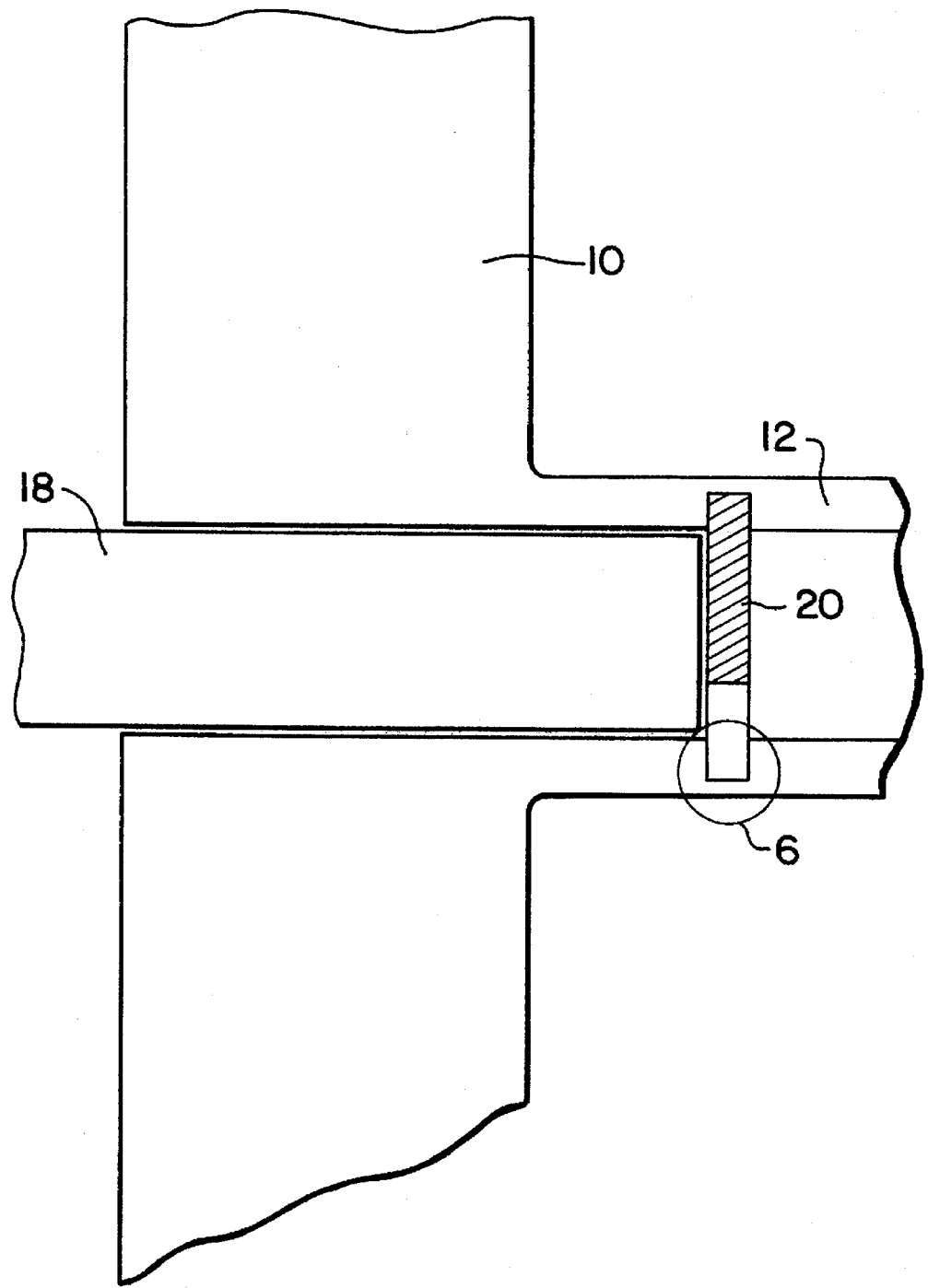
FIG. 2 is an enlarged sectional view showing a device for cutting away an interior portion of a tube.
Figure 3:
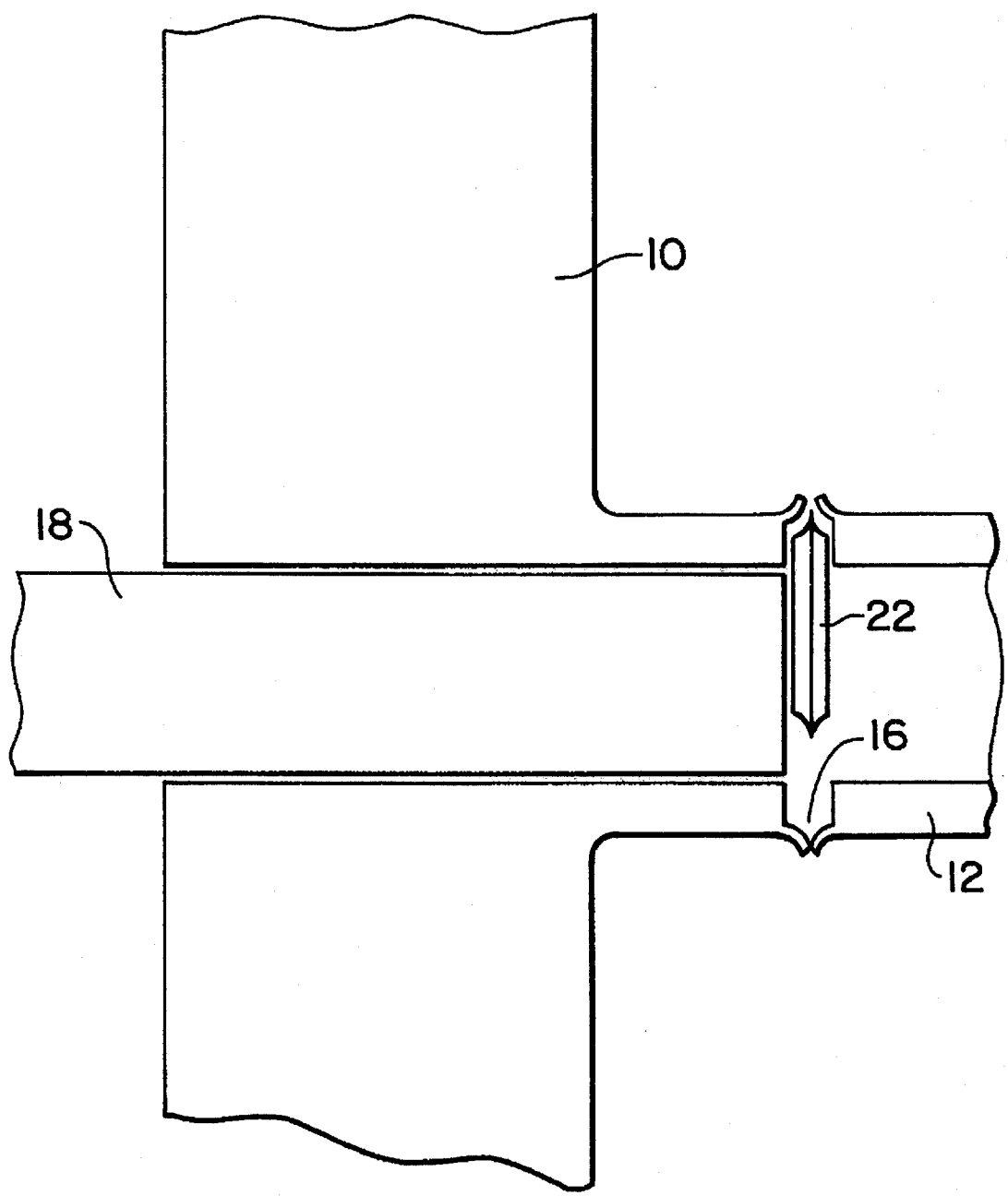
FIG. 3 is a sectional view showing the use of a cutting tool for cutting the remaining thickness of a tube.
Figure 4:
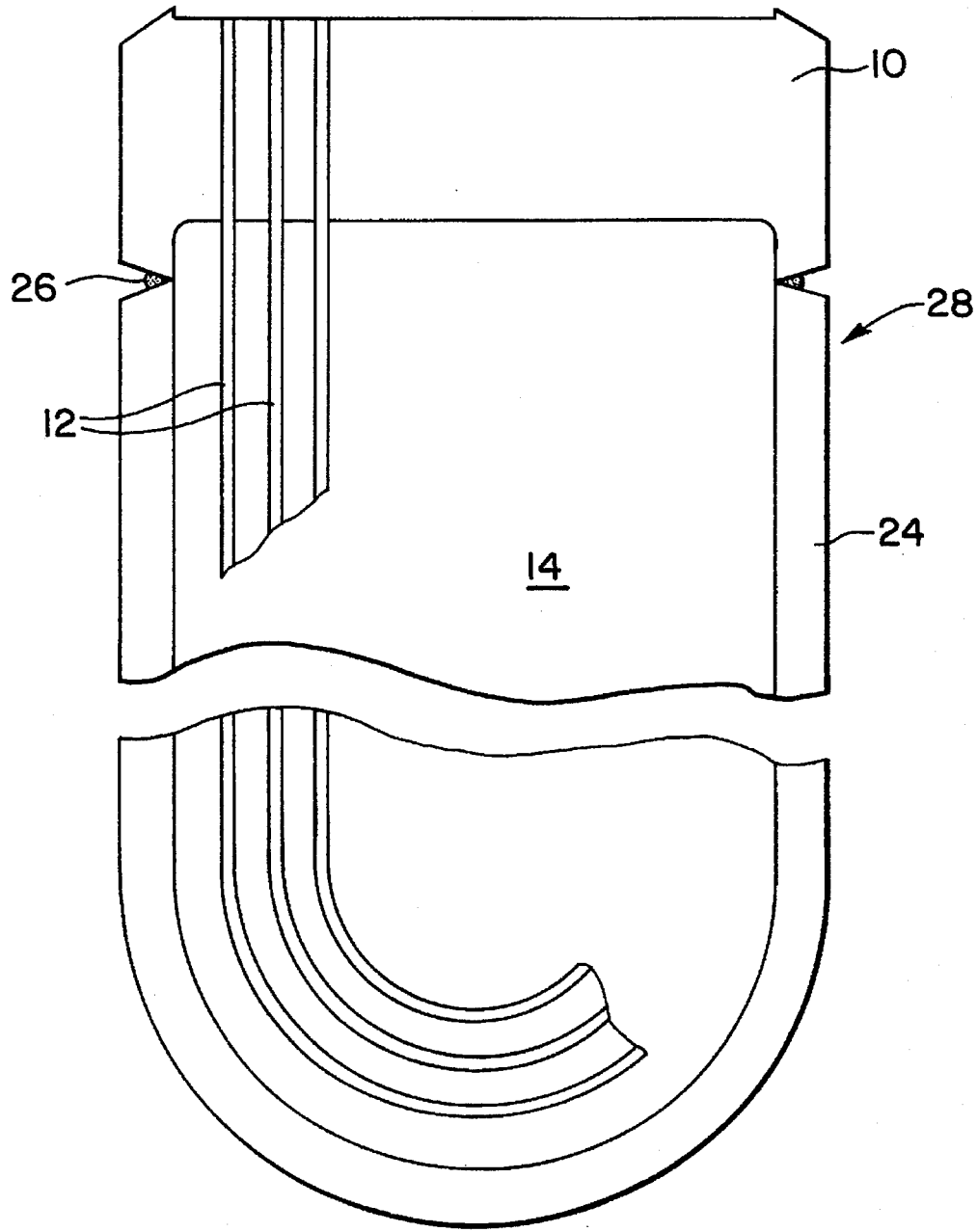
FIG. 4 is a sectional view of a steam generator vessel containing a tube bundle, including tubesheet and tubes.

FIG. 5 is a sketch of the weld prep 26 which needed to be removed from vessel 24. The assembly was set up on a Vertical Boring Machine (VBM). Using conventional tooling, the weld was removed. The remaining weld thickness was inspected for thickness by ultrasonic probes. Additional cuts were made to reduce the weld thickness to ⅛".

A pipe cutter at 30 in FIG. 6, similar to a pizza cutting wheel was used to extrude the final weld material and sever it from the vessel section.

The invention uses the specially designed "pipe cutter" 30 used to extrude the final weld thickness as well as the basic concept of parting a vessel in this manner to eliminate the concern for cleanliness.

The operation was successful and the tooling worked as envisioned. The cleanliness was maintained and there was a considerable savings in time and cost.

The inventive operation is the parting of large sections by the extrusion method rather than milling or grinding which would produce chips or grinding dust. These particles would violate the cleanliness of the vessel interior 14 at the parting cut. The length of the unit would also be reduced by the material which would be removed by milling or grinding. Length is not lost with the extrusion process.

As illustrated in FIG. 6, the parting tool 30 includes a circular plate portion 32 which has a substantially constant thickness, followed in a radially outward direction, by a frusto-conical tapering section 34. This is followed by a second smaller thickness cylindrical portion 36 and finally by a more gradually tapering frusto-conical extrusion edge 38. Steps 40 indicate the successive milling operations which will not violate cleanliness of the interior 14 of vessel 24, since the remaining thickness of metal at D, establishes a separation between the exterior and the interior of the vessel. Only by parting the upper and lower vessel portions with the final extruding process using the cutting tool 30, is the lower vessel portion removed, and this is achieved without producing any chips or particles which are normally produced by the milling operation.

While specific embodiments of the invention have been shown and described in detail to illustrate the application of the principles of the invention, it will be understood that the invention may be embodied otherwise without departing from such principles.

What is claimed is:

1. A method of removing a tube bundle made of a tubesheet and a plurality of tubes connected to the tubesheet, from a vessel which is connected to the tubesheet by a weld seam, comprising:

removing material to reduce the size of the weld seam around the vessel;

milling the vessel at the weld seam to reduce the wall thickness of the vessel; and using a wheel cutter to extrude the reduced wall thickness of the vessel in the weld seam to separate the vessel from the tubesheet without producing chips and particles.

2. A method according to claim 1, including making multiple step-shaped milling cuts in the vessel in the area of the weld seam to reduce the wall thickness of the vessel in the weld seam.

3. A method according to claim 2, wherein the wheel cutter comprises a disk having a substantially uniform thickness, a tapering frusto-conical section around a periphery of the disk, a further small thickness cylindrical around the frusto-conical portion and a final conical portion which tapers to a greater extent than the frusto-conical portion, forming an outer extrusion edge of the wheel cutter for separating the vessel from the tubesheet.

4. A method according to claim 1, wherein the weld seam is initially approximately ⅜" thick, the steps of removing weld and milling the vessel to reduce its thickness, reducing the wall thickness of the vessel to about ⅛", followed by severing the ⅛" wall thickness using the wheel cutter.

* * * * *